(12) United States Patent
Kamiyama et al.

(10) Patent No.: US 7,713,374 B2
(45) Date of Patent: May 11, 2010

(54) PIPELINE LINING METHOD

(75) Inventors: Takao Kamiyama, Hiratsuka (JP); Koji Kaneta, Hiratsuka (JP); Kenji Fujii, Hiratsuka (JP); Katsuyori Miura, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 0 days.

(21) Appl. No.: 11/805,198

(22) Filed: May 21, 2007

(65) Prior Publication Data

US 2007/0275162 A1    Nov. 29, 2007

(30) Foreign Application Priority Data

May 23, 2006 (JP) ............................. 2006-142211

(51) Int. Cl.
B29C 65/00 (2006.01)
B32B 37/00 (2006.01)
F16L 55/16 (2006.01)

(52) U.S. Cl. .................. 156/294; 156/287; 138/98; 264/36.16

(58) Field of Classification Search .......... 156/287, 156/294, 293, 498; 239/547; 427/230, 236, 427/237, 238; 138/97, 98; 264/36.16, 36.17
See application file for complete search history.

(56) References Cited

U.S. PATENT DOCUMENTS 3,874,591 A * 4/1975 Werner .................. 239/106
5,225,121 A * 7/1993 Yokoshima ............. 264/36
6,050,300 A * 4/2000 Schwert et al. ........... 138/98

FOREIGN PATENT DOCUMENTS

WO    WO 2006049089 A1  *  5/2006

* cited by examiner

*Primary Examiner*—Richard Crispino
*Assistant Examiner*—Brian R Slawski
(74) *Attorney, Agent, or Firm*—Adams & Wilks

(57) ABSTRACT

A pipe lining material is inserted into a pipeline and expanded to press against an inner peripheral surface of the pipeline. Hot water from a first fluid source is sprayed onto the pipe lining material via a hose to cure the thermosetting resin impregnated therein and thereby cure the pipe lining material, with the sprayed hot water being accumulated in a bottom part of the pipe lining material. The hot water accumulated in the bottom part of the pipe lining material is delivered to a second fluid source separate and independent from the first fluid source, cooled in the second fluid source to provide cooling water, and supplied to the hose. The cooling water is sprayed onto the cured pipe lining material via the hose to cool the cured pipe lining material.

17 Claims, 8 Drawing Sheets

PIPELINE LINING METHOD

BACKGROUND OF THE INVENTION

1. Field of the Invention

The present invention relates to a pipeline lining method, and more specifically relates to a pipeline lining method for lining a pipeline in order to repair an aged pipeline.

2. Description of the Prior Art

In order to repair an aged sewer pipe or other pipeline buried under ground without removing it therefrom, pipeline lining methods have been proposed in which a tubular pipe lining material impregnated with a thermosetting resin is inserted into the pipeline, the pipe lining material is expanded by air pressure or the like and pressed against an inner peripheral surface of the pipeline, and the thermosetting resin impregnated in the pipe lining material is heated and cured to line the pipeline. To heat and cure the pipe lining material, a method is employed in which steam (water vapor) or a hot water shower is used. A heating method is also proposed in which hot water is sprayed or made into a mist, or in which the pipe is filled with hot water.

A method is also known from, e.g., Japanese Patent No. 2501048 in which curing is achieved by a hot water shower. In such a method, a hot water hose in which a plurality of spray openings for spraying hot water is formed at predetermined intervals in a length direction is inserted into the pipeline along with the pipe lining material, and the pipe lining material is expanded by air pressure. High-temperature hot water is then pressurized and supplied to the hot water hose while the pipe lining material is pressed against the inner peripheral surface of the pipe. Hot water is sprayed as a hot water shower from the spray openings of the hot water hose and is blown against the inner peripheral surface of the pipe lining material to heat and cure the pipe lining material.

Since the pipe lining material is still hot after the pipe lining material has been cured, cool water (normal temperature) is prepared by a separate water-supplying truck, and the cool water is sprayed onto the pipe lining material to cool the hot pipe lining material.

However, in the prior art, a water truck for supplying cool water must be provided separately from the device for supplying the hot water used to thermally cure the pipe lining material in order to cool the cured pipe lining material. A problem therefore arises in that the water truck must be transported and a parking space must be made available for the water truck.

Other difficulties have been encountered in the conventional methods for curing the lining material. With methods for filling the pipe with hot water, a large amount of water is required. With methods in which the hot water is sprayed in a punctual pattern, the temperature of the entire lining material is not readily controlled. Therefore, some parts of the lining material will become hot before other parts, curing will be inconsistent, and a stable quality will not be readily guaranteed.

Furthermore, dramatic variations occur due to pressure and hole size when hot water is sprayed, and uniform spraying is not readily achieved.

Therefore, it is an object of the invention to provide an inexpensive pipeline lining method that enables the pipe lining material to be uniformly heated and cured and the thermally cured pipeline lining material to be cooled at a low cost.

SUMMARY OF THE INVENTION

The present invention provides a pipeline lining method in which a tubular pipe lining material impregnated with thermosetting resin is inserted into a pipeline and the thermosetting resin therein is cured to line the pipeline. The method according to the present invention comprises the steps of inserting the pipe lining material into the pipeline and expanding it to press against an inner peripheral surface of the pipeline; spraying hot water or steam onto the pipe lining material to cure the thermosetting resin impregnated therein, the sprayed hot water or steam being accumulated in a bottom part of pipe lining material; pumping the accumulated hot water to an external location and cooling it for use as cooling water; and spraying the cooling water onto the cured pipe lining material to cool the pipe lining material.

In the present invention, the hot water or steam used to cure the thermosetting resin is pumped out to an external location and cooled to generate cooling water, which is then used to cool the cured pipe lining material. Therefore, a water truck for cooling need not be provided, the amount of road space used at a construction site is reduced, and the amount of water consumed by the construction project can be minimized. In addition, the high-temperature pipe lining material is cooled once the pipe lining material has been cured. Therefore, the characteristics of the cured pipe lining material can be improved.

Further features of the invention, its nature and various advantages will be more apparent from the accompanying drawings and following detailed description of the invention.

BRIEF DESCRIPTION OF THE DRAWINGS

FIG. 4b is a cross-sectional view along line B-B of FIG. 4a;

DESCRIPTION OF THE PREFERRED EMBODIMENTS

The present invention will now be described in detail with reference to the embodiments shown in the accompanying drawings.

Figure 1:
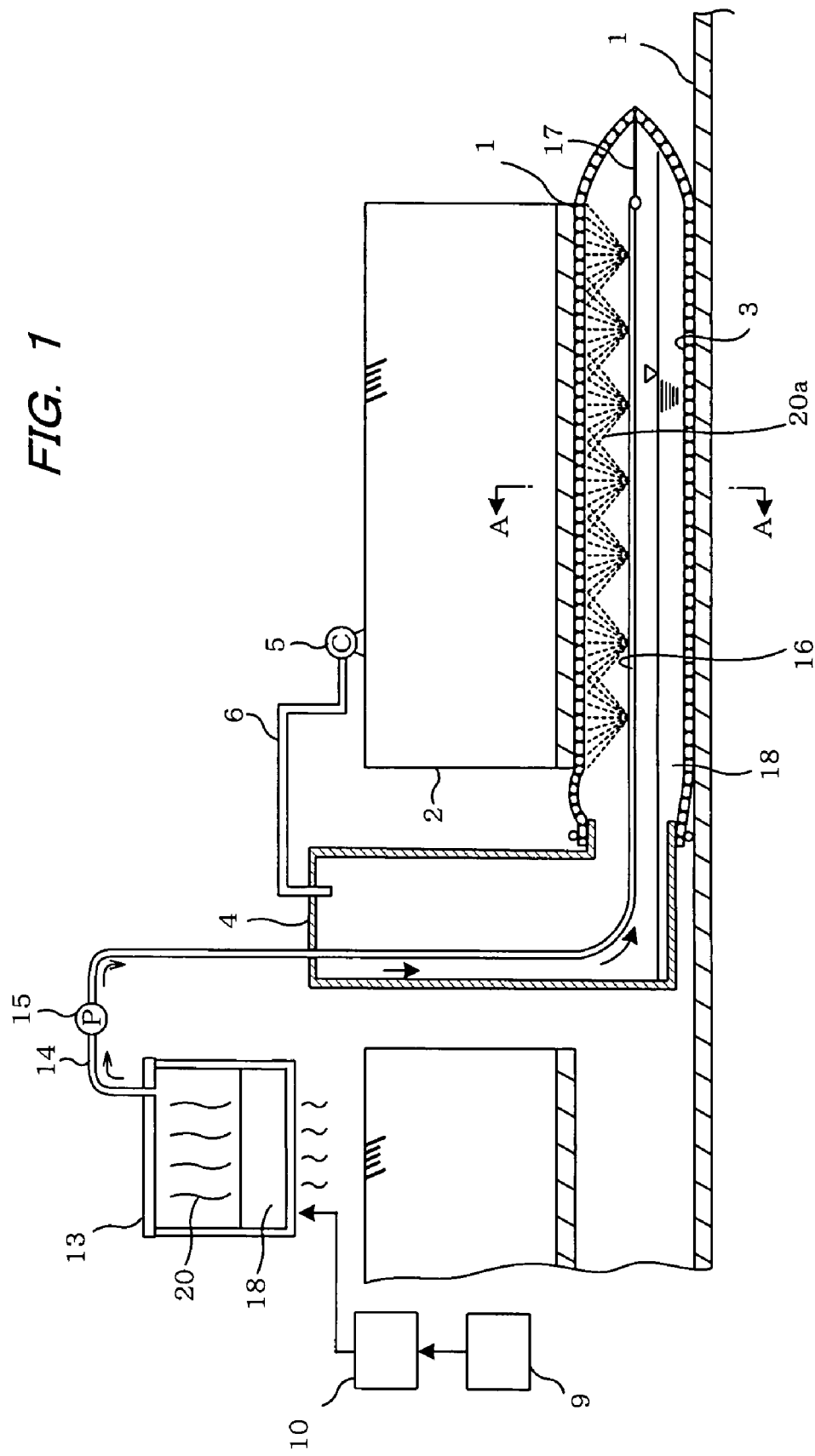
FIG. 1 is a cross-sectional view showing a pipeline lining method of the present invention.

FIG. 1 is a cross-sectional view showing a pipeline lining method. The reference symbol 1 indicates a sewer pipe or another aging pipeline buried under ground. When the pipeline is repaired, a flexible tubular pipe lining material 3 is first set at the entry of the pipeline 1 from a manhole 2 that is in communication with the pipeline 1, and compressed air or another pressurized medium is enacted upon a pressure container 4 from an air compressor 5 via a pipe 6. This causes the pipe lining material 3 to be turned inside out and inserted into the pipeline 1.

The lining material 3 is made of a non-woven fabric composed of polyester, vinylon, acrylic, or another fiber that is sewn into a tubular shape to form a flexible tubular resin-absorbing material. The lining material 3 is impregnated with unsaturated polyester resin, vinyl ester resin, epoxy resin, or another thermosetting resin with its one surface (a surface that is the exterior surface before being everted and inserted into the pipeline 1) being covered by a highly airtight film. A distal end part of the lining material 3 is closed and a rear end part is open. The rear end part is coupled in airtight fashion to an open part formed on one side of a lower end part of the pressure container 4 disposed in the manhole 2.

Water supplied from a water tank 9 is softened by a water softening machine 10 and then supplied to a steam tank 13. A heater (not shown) is used to heat the steam tank 13 to make hot water 18, which-boils to generate steam 20. A steam pump 15 is connected to an upper part of the steam tank 13 via a pipe 14. Steam is fed through a steam hose 16 via the steam pump 15. The steam hose 16 is coupled to a distal end part of the pipe lining material 3 using a rope 17, and inserted into the pipeline 1 as the pipe lining material 3 is being everted and inserted.

Figure 2:
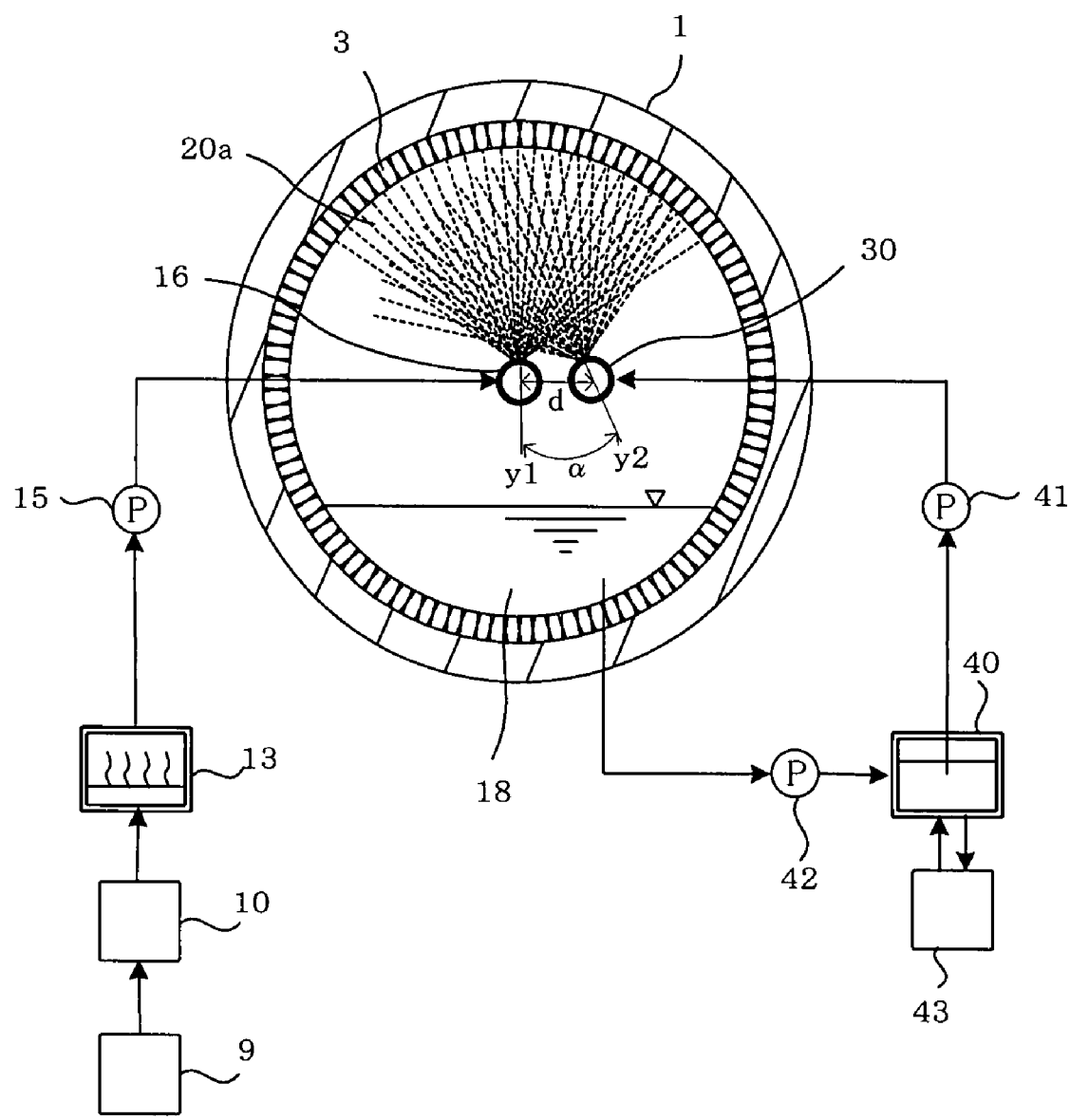
FIG. 2 is a cross-sectional view along arrow-headed line A-A of FIG. 1.
Figure 3:
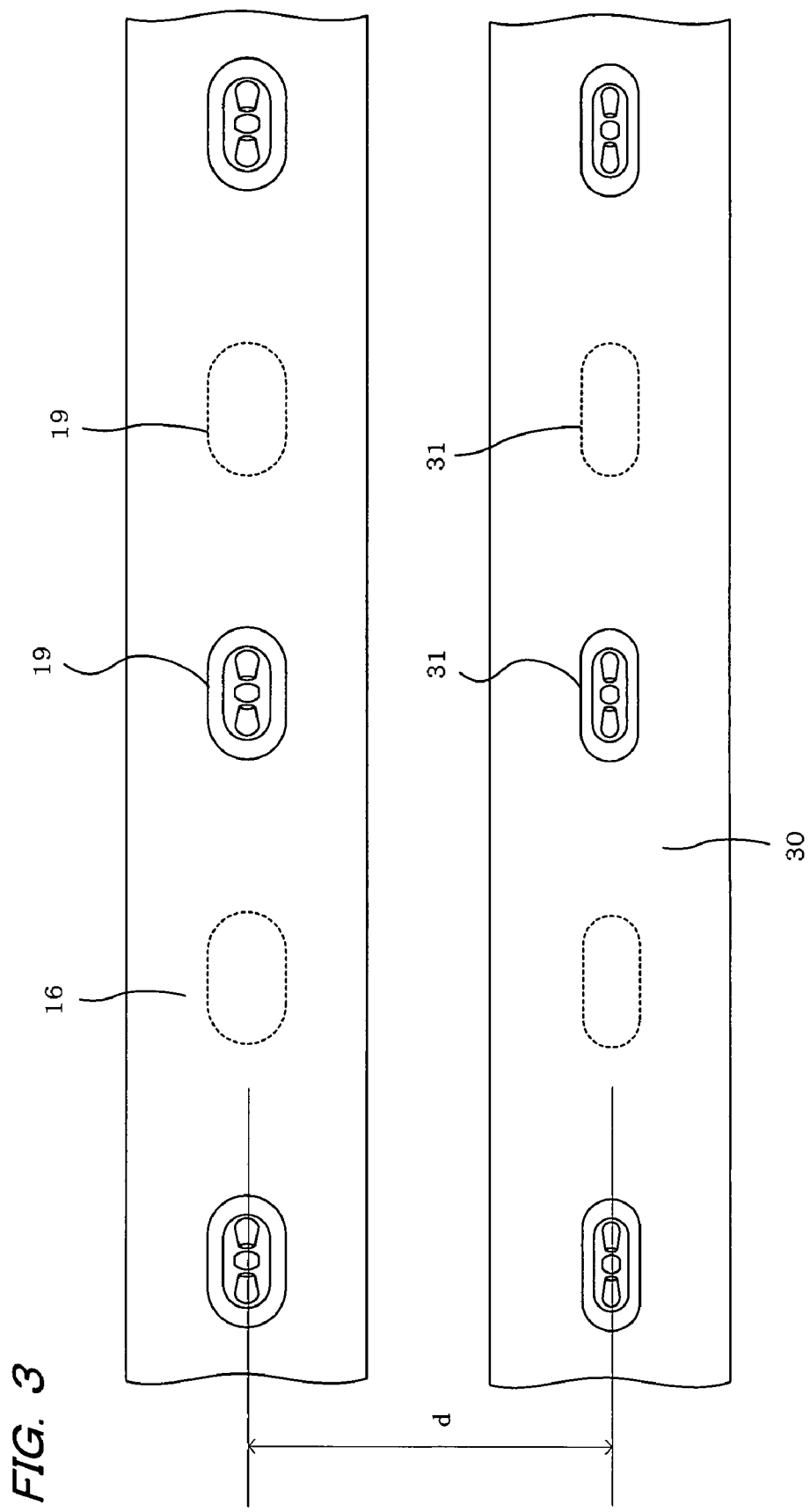
FIG. 3 is an enlarged top view of a steam hose and a coolant hose.

A distal end part of a coolant hose 30 shown in FIGS. 2 and 3 (but not in FIG. 1) is also coupled with a distal end part of the lining material 3 using the rope 17 in the same manner as with the steam hose 16. The coolant hose 30 is accordingly inserted into the pipeline 1 along with the steam hose 16 as the pipe lining material 3 is being everted and inserted. The coolant hose 30 is disposed alongside the steam hose 16 at a distance d, as shown in FIGS. 2 and 3.

Cooling water (normal-temperature water) is supplied via a pump 41 to the coolant hose 30 from a water tank 40 cooled by a cooling device 43, as shown in FIG. 2. The hot water 18 that accumulates in a lower part of the pipe lining material 3 is pumped out by a pump 42 and supplied to the water tank 40.

The portions of the pressure container 4 through which the steam hose 16 and coolant hose 30 are inserted are kept airtight by, e.g., a gasket (not shown).

Figure 4A:
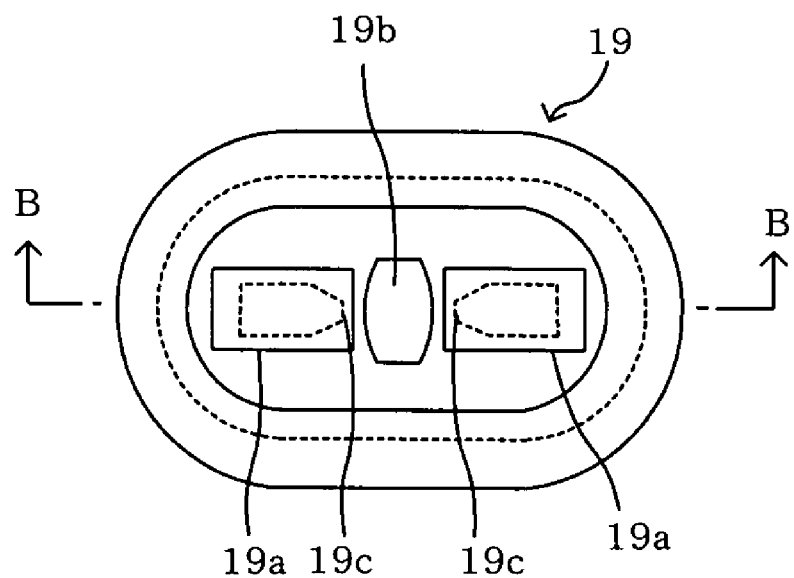
FIG. 4a is a top view showing a structure of a sprayer.
Figure 4B:
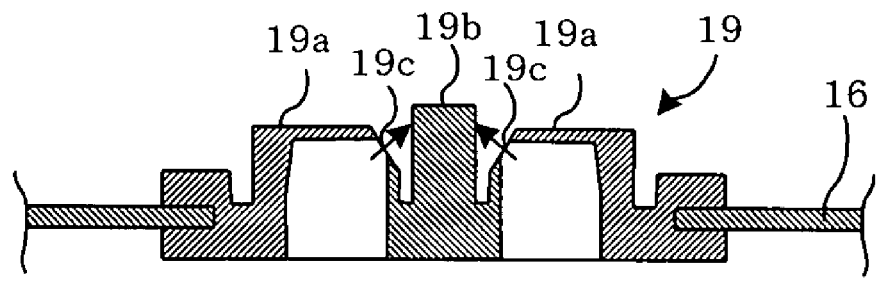

A plurality of sprayers 19 is provided to the steam hose 16 as spraying means at equal intervals in a length direction of the hose, as shown in FIG. 3. As shown in FIGS. 4a and 4b, the sprayers 19 have two nozzles 19a. Steam sprayed from nozzle holes 19c in the nozzles is diffused by a diffusing member 19b and sprayed as steam mist 20a. In the present invention, the term "steam mist" refers to a mixture composed of the steam and a plurality of small water drops (mist) in the form of a mist resulting from the condensed steam.

Sprayers 31 having the same configuration as the sprayers 19 are provided to the coolant hose 30. Cooling water is sprayed in the form of a mist from the coolant hose 30 via the sprayers 31. A plurality of the sprayers 31 of the coolant hose 30 is disposed at the same positions in the length direction of the hose as the sprayers 19 and at the same intervals as the sprayers 19.

A configuration may also be adopted in which the diffusing members 19b of the sprayers 19, 31 are omitted. The sprayers 19, 31 may also be provided to a lower side as indicated by a broken line in FIG. 3, and provided to left and right sides as well.

Before the everted and inserted pipe lining material 3 is heated and cured, compressed air is applied via the air compressor 5, and the pipe lining material 3 is made to expand and press against the inner peripheral surface of the pipeline 1. In this state, the steam tank 13 is heated to generate steam 20, and the steam pump 15 is driven to supply the steam 20 under pressure to the steam hose 16. As shown in FIG. 2, the steam 20 is uniformly diffused in all directions around a perpendicular direction y1, sprayed from the sprayers 19 as the steam mist 20a, and blown against the inner peripheral surface of the pipe lining material 3, thus heating the pipe lining material 3.

When the steam mist is at a high temperature and is blown directly against the pipe lining material, a risk may arise that the characteristics of the pipe lining material will deteriorate, depending on the type of pipe lining material. Therefore, the steam mist is cooled, which reduces the temperature of the steam mist when blown against the pipe lining material.

The cooling water is sprayed from the sprayers 31 of the coolant hose 30 toward the pipe lining material 3 in order to cool the steam mist effectively. A spraying direction y2 is inclined an angle a from the direction y1 (perpendicular direction) in which the steam mist is sprayed from the steam hose 16 toward the pipe lining material 3. The lines y1 and y2 are set so as to intersect substantially at the inner surface of the pipe lining material 3. The spraying direction y2 of the cooling water from the sprayers 31 is thus inclined from the spraying direction y1 of the steam mist from the sprayers 19 of the steam hose 16. This allows the steam mist to be uniformly cooled by the cooling water sprayed from the sprayers 31.

The cooling water supplied from the coolant hose 30 is used to cool the steam mist or, as described below, to cool the cured pipe lining material. The cooling water is intended to be about ambient temperature (about 20° C.) or an otherwise normal temperature below ambient temperature.

The pipeline 1 is thus lined as a result of the curing of the thermosetting resin impregnated in the pipe lining material 3 heated by the cooled steam mist.

After the pipe lining material 3 has been cured, the heating of the steam tank 13 and the driving of the pump 15 are stopped, but the pumps 41, 42 continue to be driven to circulate via the water tank 40 the hot water 18 that has accumulated in the bottom part of the pipe lining material 3. The water tank 40 is cooled by the cooling device 43. The hot water 18, which has a temperature of about 70 to 80° C., becomes normal-temperature cooling water having a temperature of 20° C. or less, and is sprayed in the form of a mist onto the cured pipe lining material 3 via the sprayers 31 of the coolant hose 30. Accordingly, the pipe lining material 3 is effectively cooled, and the strength of the pipe lining material 3 can be improved.

In the prior art, a water truck for cooling must be provided in order to cool the cured pipe lining material. However, in the present invention, the equipment for cooling the steam mist requires no additional apparatus. Therefore, the water truck for cooling does not need to be provided, the amount of road space used at a construction site is reduced, and the amount of water consumed by the construction project can be minimized.

In the above-described embodiment, a configuration may be adopted in which the hot water 18 that has collected at the bottom part of the pipe lining material 3 is returned to the steam tank 13 via a pump (not shown), and the hot water used for the steam is circulated.

In the above-described embodiment, the steam mist sprayed from the steam hose 16 is actively cooled. However, the characteristics of some pipe lining materials do not require cooling to be performed. When such a pipe lining material is used, a configuration may be adopted in which a single hose is used as a steam/coolant hose, the steam mist is sprayed via the hose when the pipe lining material is to be cured, and the cooling water is sprayed via the same hose when the cured pipe lining material is cooled.

Figure 5:
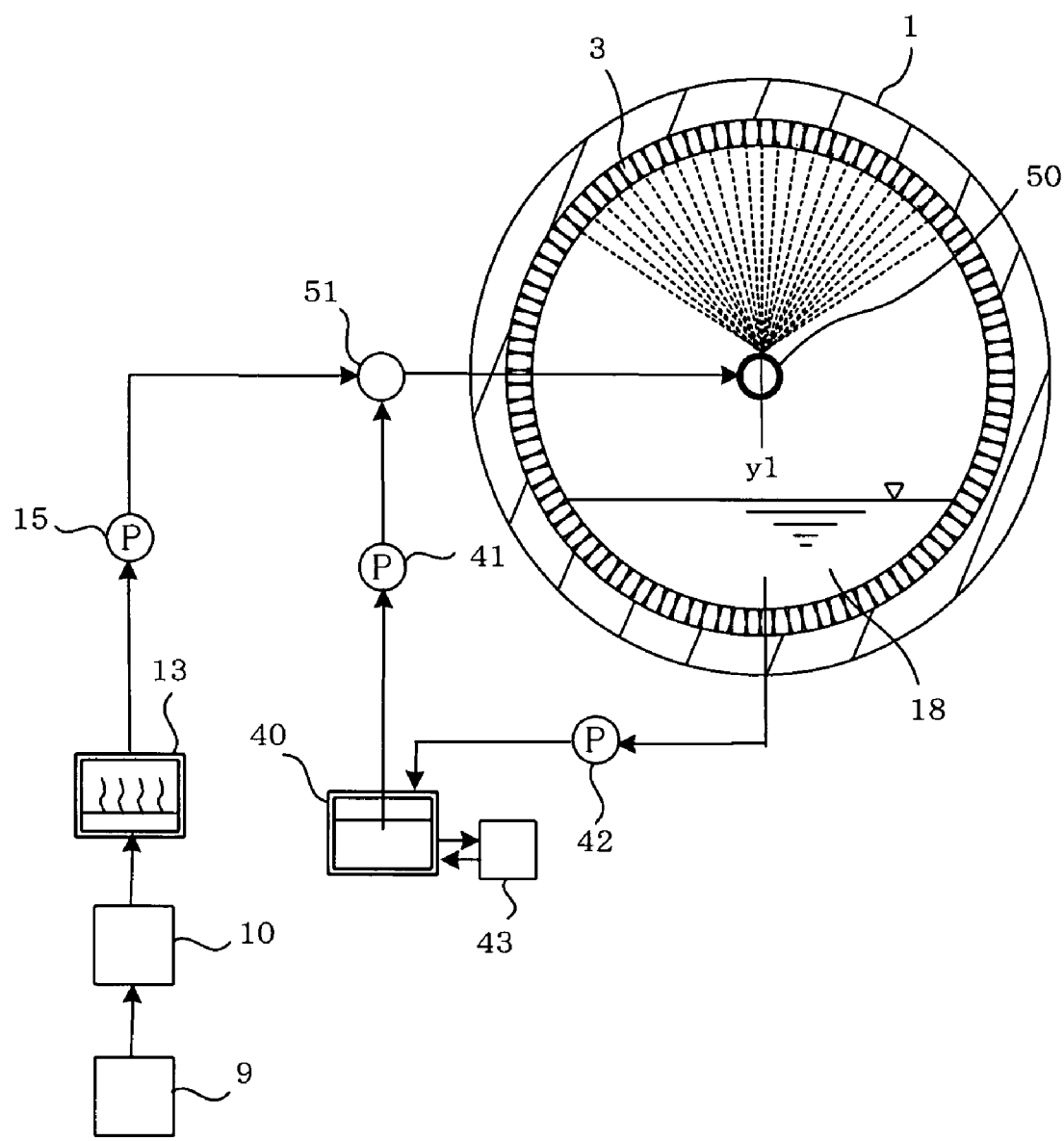
FIG. 5 is a cross-sectional view corresponding to FIG. 2 showing another embodiment of the present invention.

FIG. 5 shows such an embodiment in which a steam/coolant hose 50 is provided instead of the steam hose 16. The structure of this hose is similar to that of the steam hose 16. A plurality of sprayers similar to the sprayers 19 is provided to the hose 50.

When the pipe lining material 3 is to be cured, a switching valve 51 is switched to a steam side and steam from the steam tank 13 is supplied to the hose 50 and sprayed as steam mist from the sprayers provided to the hose 50 to heat and cure the thermosetting resin in the pipe lining material 3. After the pipe lining material 3 has been cured, the switching valve 51 is switched to a cooling water side and cooling water is supplied from the water tank 40 to the hose 50 and sprayed in the form of a mist from the sprayers provided to the hose to thereby cool the cured pipe lining material 3.

The same effect can be obtained in this embodiment as in the first described embodiment.

Figure 6:
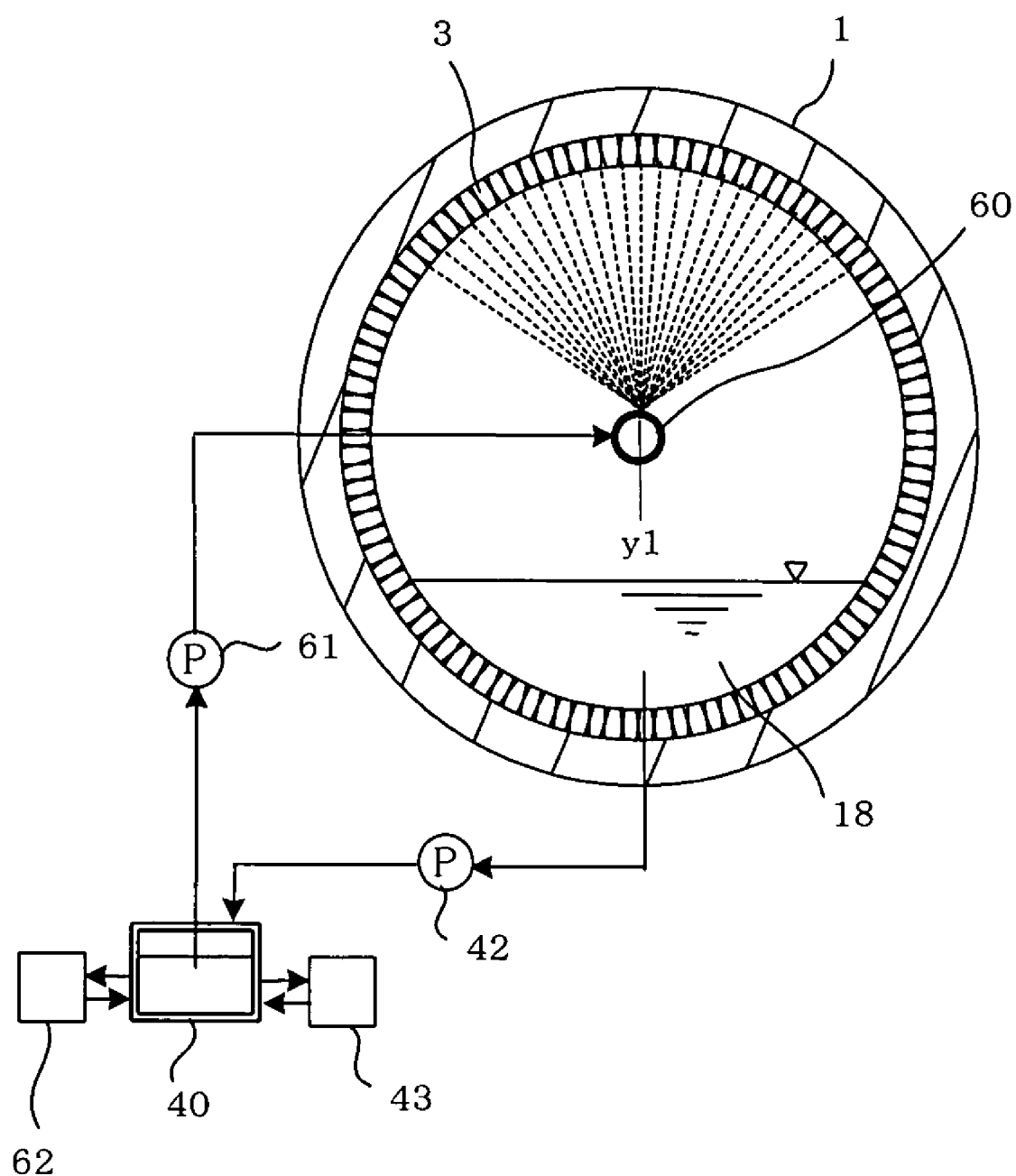
FIG. 6 is a cross-sectional view corresponding to FIG. 2 showing yet another embodiment of the present invention.

The pipe lining material 3 can also be cured by high-temperature hot water instead of steam. For example, as shown in FIG. 6, the water tank 40 is heated by a boiler 62, and high-temperature hot water is supplied to a hot water/coolant hose 60 via a hot water pump 61. The hot water/coolant hose 60 has a configuration similar to those of the steam hose 16 and the steam/coolant hose 50. The hot water becomes hot water mist and is sprayed onto the pipe lining material 3 from sprayers of the hot water/coolant hose 60. This causes the pipe lining material 3 to be heated and cured.

After the pipe lining material 3 has been cured, the operation of the boiler 62 is suspended, and the cooling device 43 is driven to cool the hot water 18 supplied from the pump 42. The hot water, which has now become cooling water, is then supplied to the hose 60 via the hot water pump 61. The cooling water is sprayed in the form of a mist from the sprayers of the hose 60 to cool the cured pipe lining material 3. The same effect can also be obtained in this embodiment as in the embodiments as mentioned above.

Figure 7A:
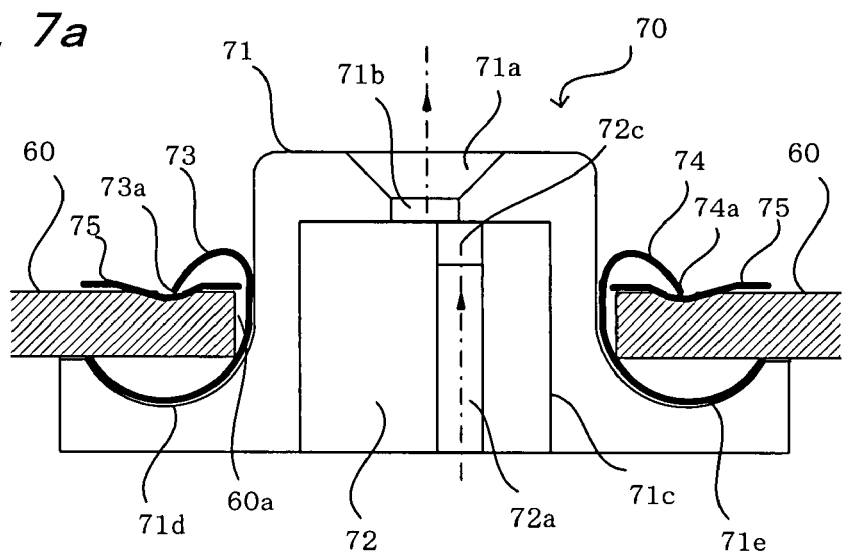
FIG. 7a is an illustrative view showing a state in which the sprayer is mounted on a hose.
Figure 7B:
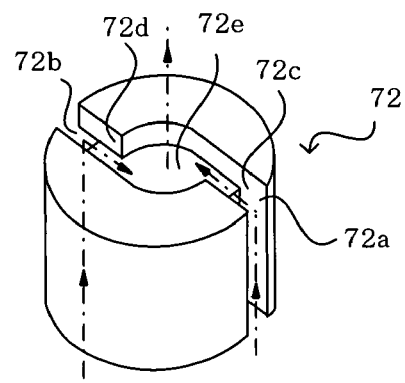
FIG. 7b is a perspective view of a fitting member of the sprayer.
Figure 7C:
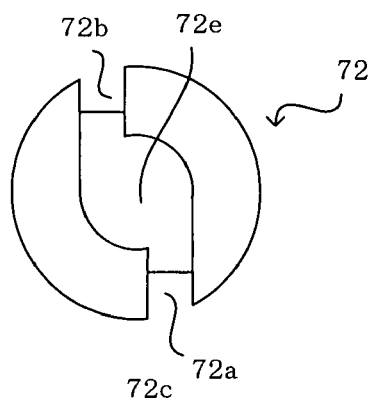
FIG. 7c is a top view of the fitting member.
Figure 7D:
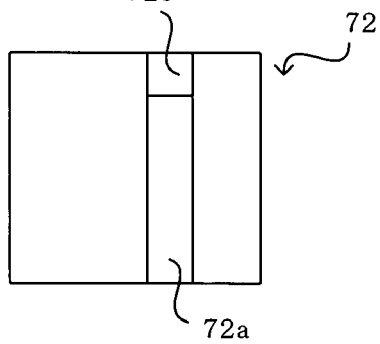
FIG. 7d is a side view of the fitting member.
Figure 8:
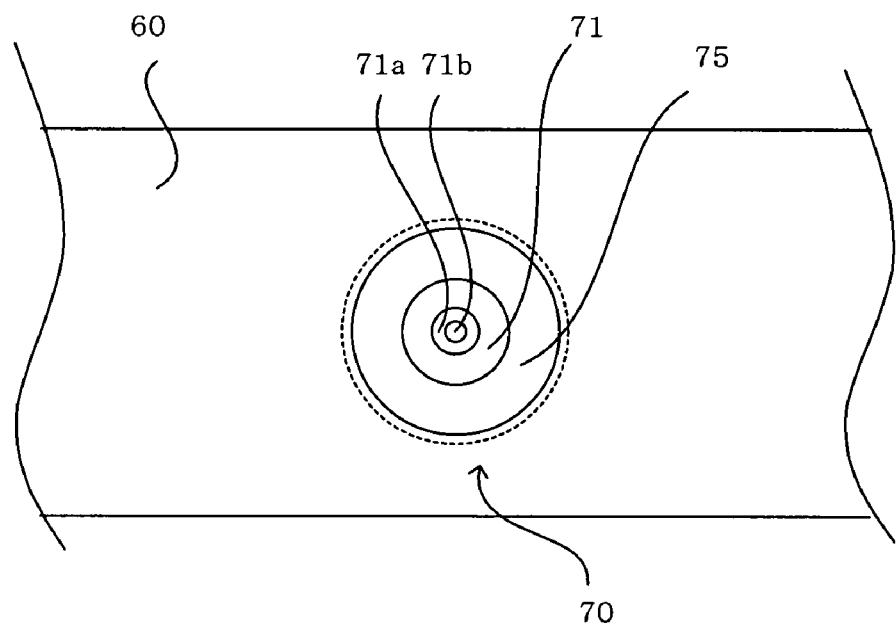
FIG. 8 is a top view showing the hose on which the sprayer is mounted.

FIGS. 7 and 8 show another embodiment of a sprayer 70 (spray system) for uniformly spraying hot water to uniformly heat and cure the entire pipe lining material. The sprayer 70 comprises a nozzle unit 71 and a fitting member 72 that fits into the nozzle unit 71, as shown in FIG. 7a. The nozzle unit 71 has a conical nozzle opening 71a, a cylinder part 71b that communicates with the nozzle opening, curved parts 71d, 71e that expand on either side, and a fitting part 71c formed below the nozzle opening 71a. The cylindrical fitting member 72 shown in FIGS. 7b through 7d fits into the fitting part 71c. Longitudinal grooves 72a, 72b that extend in a perpendicular direction are formed on the fitting member 72 at positions facing a radial direction. The longitudinal grooves 72a, 72b pass through a cylindrical groove 72e positioned below a central part of the nozzle unit 71 via transverse grooves 72c, 72d. Elastic mounting fixtures 73, 74 are fitted into the curved parts 71d, 71e of the nozzle unit 71. Distal ends 73a, 74a of the mounting fixtures are bent downward.

The sprayer 70, which has the fitting member 72 fitted into the nozzle unit 71, can thus be used for the sprayers 19 (31) of the embodiments as mentioned above. FIG. 7a shows a state in which the sprayer 70 has been attached to the hot water/coolant hose 60 in FIG. 6. The nozzle unit 71 of the sprayer 70 is passed through an open part 60a of the hot water/coolant hose 60, and the hot water/coolant hose 60 is firmly held between the curved parts 71d, 71e and the distal ends 73a, 74a of the fixtures 73, 74 via a ring-shaped fixture 75. This allows the sprayer 70 to be attached to the hot water/coolant hose 60. A state in which the sprayer 70 is mounted on the hot water/coolant hose 60 is shown as a top view in FIG. 8.

The nozzle unit 71 and fitting member 72 of the sprayer 70 are both made of, e.g., a resin, metal, ceramic, or wood. In the examples shown in the drawings, only two longitudinal grooves are provided. However, more than two longitudinal grooves may be formed on the periphery of the fitting member.

Figure 9:
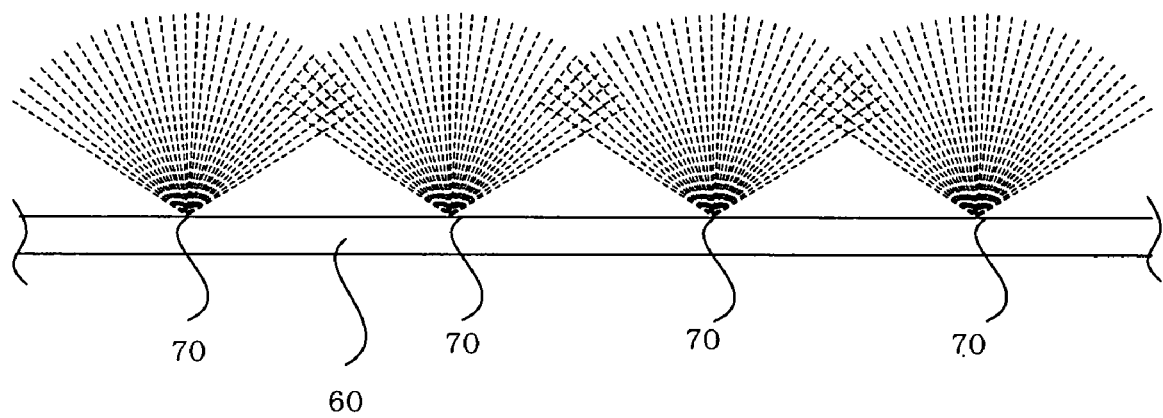
FIG. 9 is an illustrative view showing a state in which hot water is sprayed from the hose.

How the sprayer 70 works in such a configuration will be described based on the embodiment in FIG. 6. The water tank 40 is heated by the boiler 62, and high-temperature hot water is supplied to the hot water/coolant hose 60 via the hot water pump 61. The hot water ascends perpendicularly through the longitudinal grooves 72a, 72b of the fitting member 72 of the sprayer 70, passes through the transverse grooves 72c, 72d, converges in the cylindrical groove 72e, and is sprayed upward via the nozzle opening 71a of the nozzle unit 71, as indicated by the dotted/dashed line in FIGS. 7a and 7b. The spray state is shown in FIG. 9. The hot water is uniformly sprayed from the hot water/coolant hose 60 in all directions, enabling the entire pipe lining material 3 to be uniformly heated and the thermosetting resin impregnated in the pipe lining material 3 to be cured.

After the pipe lining material 3 has been cured, the operation of the boiler 62 is suspended, and the cooling device 43 is driven to cool the hot water 18 supplied from the pump 42. The hot water, which has now become cooling water, is then supplied to the hose 60 via the hot water pump 61, and is sprayed from the sprayer 70. The cooling water is also uniformly sprayed in all directions in the same manner in which the hot water was sprayed, thereby allowing the entire pipe lining material 3 to be uniformly cooled to a normal temperature.

In this configuration, the hot water, which is sprayed uniformly in a wider range, is used to heat and cure the pipe lining material in a uniform manner. Accordingly, stable quality can be ensured without any incidence of inconsistent curing. Furthermore, the time required for curing can be reduced, and the amount of water can be reduced by about half or more.

Cooling the thermally cured pipe lining material in steps rather than in a rapid process enables more stable quality to be ensured without any risk of diminished strength.

The cooling water truck needed in the prior art is rendered unnecessary. The amount of water used at the construction site can be reduced, the initial arrangements associated therewith need not be performed, and the time required for the construction project can be reduced. In addition, a water truck (water supply tank) for cooling is rendered unnecessary. This allows the amount of road space used at a construction site to be reduced and traffic congestion and the like to be avoided.

What is claimed is:

1. A pipeline lining method in which a tubular pipe lining material impregnated with a thermosetting resin is inserted into a pipeline and the thermosetting resin impregnated in the pipe lining material is cured to line the pipeline with the pipe lining material, comprising:

inserting the pipe lining material into the pipeline and expanding the pipe lining material to press against an inner peripheral surface of the pipeline;

providing a first fluid source, a second fluid source separate and independent from the first fluid source, and a switching valve that switches between the first fluid source and the second fluid source;

with the switching valve switched to the first fluid source, spraying hot water or steam from the first fluid source onto the pipe lining material via a hose to cure the thermosetting resin impregnated therein and thereby cure the pipe lining material, the sprayed hot water or steam being accumulated in a bottom part of the pipe lining material;

pumping hot water accumulated in the bottom part of the pipe lining material to the second fluid source and cooling the hot water in the second fluid source to provide cooling water;

switching the switching valve to the second fluid source to supply the cooling water to the hose from the second fluid source; and spraying the cooling water onto the cured pipe lining material via the hose to cool the cured pipe lining material.

2. A pipeline lining method according to claim 1; further comprising heating water in a steam tank as the first fluid source to provide the hot water or steam that is sprayed onto the pipe lining material via the hose, returning the hot water that has accumulated in the bottom part of the pipe lining material to a water tank as the second fluid source, cooling the hot water in the water tank, and supplying the cooling water from the water tank to the hose after the thermosetting resin impregnated in the pipe lining material has cured.

3. A pipeline lining method according to claim 1; wherein the hot water or steam and the cooling water are sprayed in the form of a mist.

4. A pipeline lining method according to claim 1; wherein the hot water or steam and the cooling water are sprayed as a shower.

5. A pipeline lining method according to claim 1; further comprising providing the hose with a sprayer having a nozzle opening and a plurality of peripherally disposed longitudinal grooves; and wherein the hot water, steam, and/or cooling water is sprayed upwardly from the nozzle opening of the sprayer via the longitudinal grooves thereof.

6. A pipeline lining method according to claim 1; wherein the second fluid source comprises a water tank, and the hot water pumped to the water tank is cooled using a cooling device connected to the water tank.

7. A pipeline lining method comprising:
providing a pipe lining material impregnated with a thermosetting resin;
providing a first fluid source, a second fluid source separate and independent from the first fluid source, and a switching valve that switches between the first fluid source and the second fluid source;
inserting the pipe lining material into a pipeline and expanding the pipe lining material to press against an inner peripheral surface of the pipeline;
with the switching valve switched to the first fluid source, supplying a first fluid to the pipe lining material from the first fluid source via a fluid line, the first fluid having a first temperature that heats and cures the thermosetting resin to thereby cure the pipe lining material; and
switching the switching valve from the first fluid source to the second fluid source to supply a second fluid to the cured pipe lining material from the second fluid source using the same fluid line via which the first fluid is supplied to the pipe lining material, the second fluid having a temperature lower than the first temperature to thereby cool the cured pipe lining material.

8. A pipeline lining method according to claim 7; wherein when the first fluid is supplied to the pipe lining material, the first fluid accumulates in a bottom part of the pipe lining material; and further comprising delivering the accumulated first fluid to the second fluid source and cooling the accumulated first fluid in the second fluid source for use as the second fluid supplied to the cured pipe lining material.

9. A pipeline lining method according to claim 8; wherein the first fluid in the first fluid source is heated in the first fluid source using a heating device connected to the first fluid source; and wherein the accumulated first fluid is cooled in the second fluid source using a cooling device connected to the second fluid source.

10. A pipeline lining method according to claim 7; wherein the first fluid is hot water and the second fluid is cool water; and wherein each of the hot water and the cool water is supplied by spraying the hot water and the cool water in the form of a mist.

11. A pipeline lining method comprising:
providing a pipe lining material impregnated with a thermosetting resin;
providing a steam tank, a water tank separate and independent from the steam tank, and a switching valve that switches between the steam tank and the water tank;
inserting the pipe lining material into a pipeline and expanding the pipe lining material to press against an inner peripheral surface of the pipeline;
heating water in the steam tank to provide hot water or steam;
with the switching valve switched to the steam tank, spraying the hot water or steam via a fluid line onto the pipe lining material to cure the thermosetting resin and thereby cure the pipe lining material, the sprayed hot water or steam accumulating in a bottom part of the pipe lining material;
supplying to the water tank the hot water accumulated in the bottom part of the pipe lining material and cooling the supplied hot water in the water tank to provide cooling water while the pipe lining material is curing; and
switching the switching valve from the steam tank to the water tank to spray the cooling water from the water tank onto the cured pipe lining material using the same fluid line via which the hot water is supplied to the pipe lining material to thereby cool the cured pipe lining material.

12. A pipeline lining method according to claim 11; wherein the hot water delivered to the water tank is cooled by operating a cooling device connected to the water tank.

13. A pipeline lining method according to claim 12; wherein the water is heated in the steam tank by operation of a heating device connected to the steam tank.

14. A pipeline lining method according to claim 1; wherein the hot water is cooled in the second fluid source while the pipe lining material is being cured so that the cooling water is available for supply to the hose and for spraying onto the pipe lining material immediately upon the pipe lining material being cured.

15. A pipeline lining method according to claim 1; wherein the hot water is cooled in the second fluid source while the hot water or steam is sprayed onto the pipe lining material so that the cooling water is available for supply to the hose and for spraying onto the pipe lining material immediately upon the pipe lining material being cured.

16. A pipeline lining method according to claim 7; wherein the first fluid is heated to the first temperature in the first fluid source using a heating device connected to the first fluid source; and wherein the second fluid is cooled to the second temperature in the second fluid source using a cooling device connected to the second fluid source.

17. A pipeline lining method according to claim 16; wherein the second fluid is cooled in the second fluid source while the heated first fluid is supplied to the pipe lining material so that the cooled second fluid is available for supply to the cured pipe lining material via the fluid line immediately upon the pipe lining material being cured.

* * * * *